United States Patent
Hansen et al.

(10) Patent No.: US 9,866,397 B2
(45) Date of Patent: *Jan. 9, 2018

(54) METHOD AND APPARATUS FOR PROVIDING ELECTRICAL POWER TO A BROADBAND DIGITAL SUBSCRIBER LINE ACCESS

(71) Applicant: TELEFONAKTIEBOLAGET LM ERICSSON (PUBL), Stockholm (SE)

(72) Inventors: Jan Hansen, Holstebro (DK); Hans Knutsson, Lemvig (DK)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/224,589

(22) Filed: Jul. 31, 2016

(65) Prior Publication Data

US 2016/0344564 A1 Nov. 24, 2016

Related U.S. Application Data

(63) Continuation of application No. 14/449,832, filed on Aug. 1, 2014, now Pat. No. 9,432,081, which is a (Continued)

(51) Int. Cl.
*H04M 11/00* (2006.01)
*H04L 12/10* (2006.01)
(Continued)

(52) U.S. Cl.
CPC ............... *H04L 12/10* (2013.01); *H04B 3/50* (2013.01); *H04L 12/2878* (2013.01);
(Continued)

(58) Field of Classification Search
CPC ........ H04L 12/10; H04L 12/2878; H04B 3/50
See application file for complete search history.

(56) References Cited

U.S. PATENT DOCUMENTS

| 6,577,882 B1 | 6/2003 | Roos |
| 6,795,538 B1 | 9/2004 | Olson |

(Continued)

FOREIGN PATENT DOCUMENTS

| EP | 1505820 A | 2/2005 |
| JP | 2000138699 A | 5/2000 |

(Continued)

OTHER PUBLICATIONS

English translation of EP Published Application No. 1505820, France Telecom, Feb. 9, 2005.

*Primary Examiner* — Simon King

(57) ABSTRACT

Power is supplied to telecom equipment in DSLAM outdoor/remote cabinets with relatively short distances between the subscriber and the cabinet. All of the subscriber Customer Premises Equipment connected to the DSLAM each provide a portion of the required power to the remote cabinet via the telephone line connecting the DSLAM and the subscriber CPE. The CPE at the subscriber premises is already connected to power mains in the subscriber premises so, providing power, via the telephone line to the outdoor cabinet is relatively simple. The remote cabinet includes a circuit for receiving the power input from each subscriber and then distributing the power, required by the DSLAM load, equally among the subscribers.

10 Claims, 2 Drawing Sheets

Related U.S. Application Data continuation of application No. 12/531,672, filed as application No. PCT/IB2007/000675 on Mar. 16, 2007, now Pat. No. 8,897,431.

(51) Int. Cl.
    *H04B 3/50*       (2006.01)
    *H04M 19/08*    (2006.01)
    *H04M 19/00*    (2006.01)
    H04L 12/28     (2006.01)
    H04L 12/64     (2006.01)

(52) U.S. Cl.
    CPC ......... *H04M 19/001* (2013.01); *H04M 19/08* (2013.01); *H04L 12/2856* (2013.01); *H04L 2012/6478* (2013.01)

(56) References Cited

U.S. PATENT DOCUMENTS

| | | |
|---|---|---|
| 2003/0165232 A1 | 9/2003 | Enriquez et al. |
| 2006/0203997 A1* | 9/2006 | Bailey ................... H04M 1/738 |
| | | 379/413 |
| 2009/0003296 A1 | 1/2009 | Zheng |
| 2010/0091661 A1 | 4/2010 | Cordsmeyer et al. |
| 2010/0150556 A1 | 6/2010 | Soto et al. |

FOREIGN PATENT DOCUMENTS

| | | |
|---|---|---|
| JP | 2003224678 A | 8/2003 |
| JP | 2003264645 A | 9/2003 |

* cited by examiner

METHOD AND APPARATUS FOR PROVIDING ELECTRICAL POWER TO A BROADBAND DIGITAL SUBSCRIBER LINE ACCESS

REFERENCE TO RELATED APPLICATIONS

This application is a continuation of U.S. patent application Ser. No. 14/449,832, filed Aug. 1, 2014, which is a continuation of U.S. patent application Ser. No. 12/531,672, filed Feb. 24, 2010, now U.S. Pat. No. 8,897,431, which is a National Stage Entry of PCT/IB2007/000675, filed Mar. 16, 2007, the disclosures of which are incorporated herein by reference.

TECHNICAL FIELD

The present invention relates to broadband services to subscribers. More particularly, and not by way of limitation, the present invention is directed to a system and method for providing power to a Digital Subscriber Line Access Multiplexer that is installed in a remote cabinet remote from a Central Office (CO).

BACKGROUND

Prior Art and Problems

With the increasing need for telecom operators, to move their telephone equipment closer to the subscribers, due to requirements for higher bandwidth on a subscriber's broadband line, the need for solutions to electrical powering of new outdoor/remote cabinets are rising. With today solutions these cabinets are either powered from mains on site or by remote powering from a CO.

The challenges of using the mains power in an outdoor cabinet is related to space and cost. In many countries the local power company requires a "power meter" to be connected to the outdoor cabinet to meter power consumption of the cabinet. The power meter as compared to the small, outdoor cabinet takes up space and increases the cost of installation and operation significantly.

By using power transmitted from the CO to the remote outdoor cabinet, unused cable pairs are required. And, in the future, the distance between the CO and the remote outdoor cabinet will be much longer than the outdoor cabinet to a subscriber's home (typical distance to home—500 meters; to CO up to 5000 meters).

It would be advantageous to have a system and method for providing power to the remote cabinet that overcomes the disadvantages of the prior art.

SUMMARY OF THE INVENTION

The present invention discloses a method and apparatus for providing power to the outdoor cabinet from subscribers' home rather than the CO or local power company. Existing telephone lines from each connected subscriber are used to transport power to the remote cabinet.

An add-on circuit will connect power from a subscriber's home back to the outdoor broadband cabinet. Circuits in the outdoor cabinet uses the subscriber provided power to distribute via the normal supply lines in the cabinet to installed broadband equipment.

Thus, in one aspect, the present invention is directed to a method of providing power to a remote cabinet providing broadband service that provides telecom service to a subscriber's facility via wireline. Electrical power is connected from the subscriber's premises to the wireline service and converted from AC to DC power. The voltage is further regulated for transmission to the remote cabinet, where the broadband service point regulates the received DC power to match the requirements of the broadband equipment in the cabinet.

In another aspect the present invention is directed to a system for providing power to a remote cabinet with broadband equipment that supplies telecom service to a subscriber's premises via telephone wires (wireline). The CPE that is installed on the subscriber's premises is modified to convert and regulate power for transmission to the broadband equipment in the remote cabinet along the same telephone lines that provide the broadband service to the subscriber.

The power is received as DC power and then regulated to match the requirements of the equipment in the cabinet.

BRIEF DESCRIPTION OF THE DRAWINGS

In the following section, the invention will be described with reference to exemplary embodiments illustrated in the figures, in which.

DETAILED DESCRIPTION

In this detailed description, numerous specific details are set forth in order to provide a thorough understanding of the embodiments of the invention. It will be understood by those skilled in the art, however, that the embodiments of the invention may be practiced without these specific details. In other instances, well-known methods, procedures, components and circuits have not been described in detail so as not to obscure the embodiments of the invention. It can be appreciated that the specific structural and functional details disclosed herein may be representative and do not necessarily limit the scope of the invention.

An embodiment of the invention may include functionality that may be implemented as software executed by a processor, hardware circuits or structures, or a combination of both. The processor may be a general-purpose or dedicated processor, such as a processor from the family of processors made by Intel Corporation, Motorola Incorporated, Sun Microsystems Incorporated and others. The software may comprise programming logic, instructions or data to implement certain functionality for an embodiment of the invention. The software may be stored in a medium accessible by a machine or computer-readable medium, such as read-only memory (ROM), random-access memory (RAM), magnetic disk (e.g., floppy disk and hard drive), optical disk (e.g., CD-ROM) or any other data storage medium. In one embodiment of the invention, the media may store programming instructions in a compressed and/or encrypted format, as well as instructions that may have to be compiled or installed by an installer before being executed by the processor. Alternatively, an embodiment of the invention may be implemented as specific hardware components that contain hard-wired logic for performing the recited functionality, or by any combination of programmed general-purpose computer components and custom hardware components.

Note that any reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
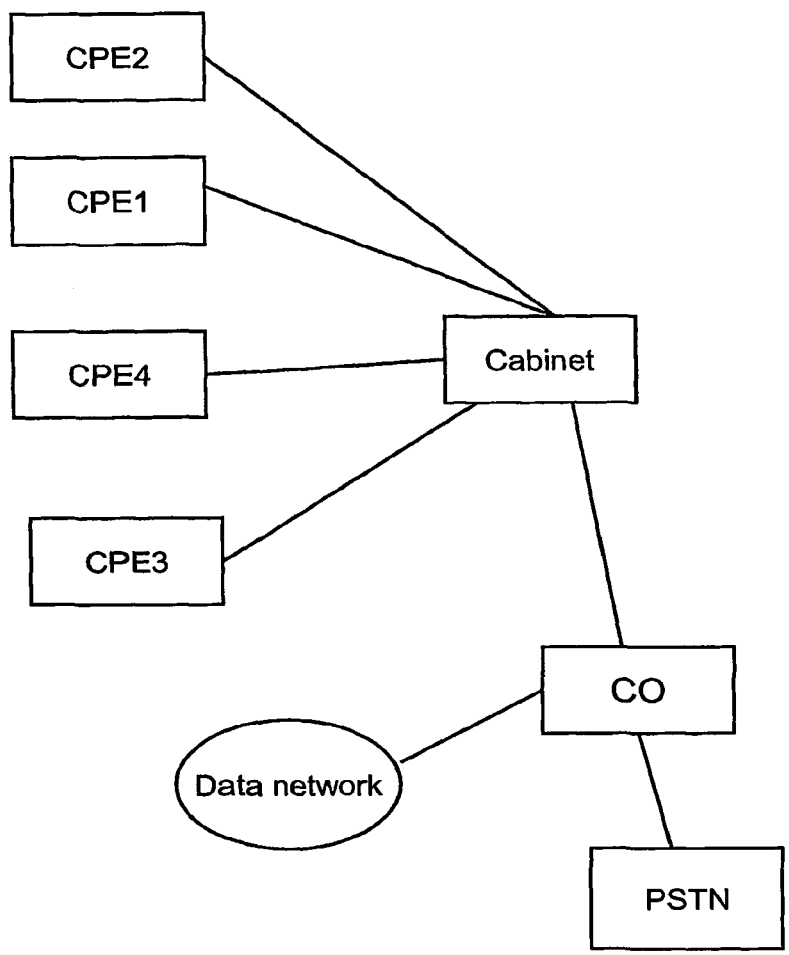
FIG. 1 depicts a high-level block diagram of portion of a network in which remote DSLAM is depicted serving four subscribers.

Referring now in detail to the drawings there is illustrated in FIG. 1 a system suitable for practicing one embodiment of the invention. FIG. 1 is a high-level block diagram of portion of a network in which remote DSLAM is depicted serving four subscribers. The subscribers are represented by the CPEs 1-4. The DSLAM is not shown, but is installed in the Cabinet. The Central Office (CO) is connected to a data network and the Public Switched Telephone network and provides broadband service to the CPEs via the DSLAM in the Cabinet.

Figure 2:
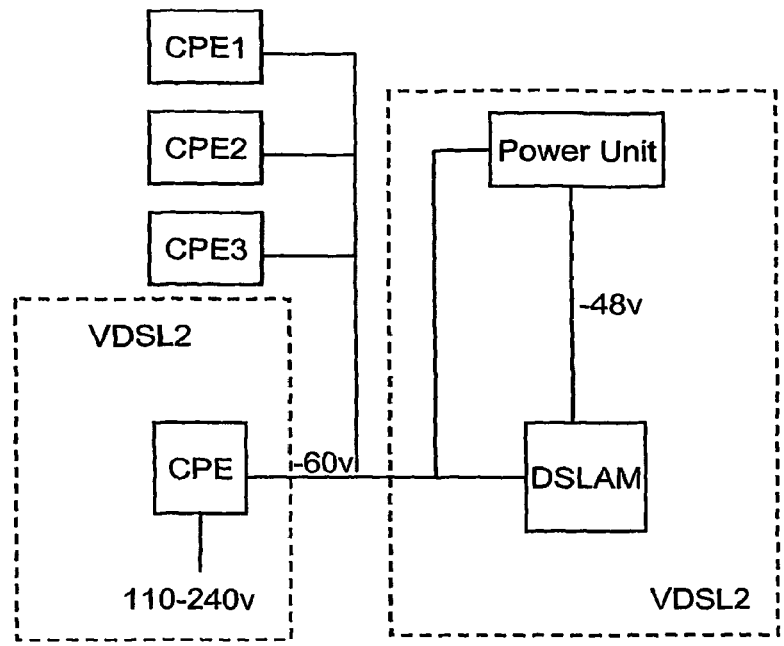
FIG. 2 illustrates a high-level block diagram of the remote cabinet in accordance with an embodiment of the present invention.

FIG. 2 illustrates a high-level block diagram of the remote cabinet in accordance with an embodiment of the present invention. The Customer Premises Equipment unit is receiving the VDSL2 service from the Remote Cabinet and the Remote Cabinet is housing a DSLAM. The DSLAM provides the VDSL2 service to more than one subscriber, represented by the CPE units designated CPE1, CPE2, CPE3 and CPE4 as depicted in FIG. 1.

Power is provided to each CPE by each subscriber premises power main (e.g., 120 vac-240 vac). The power is converted and transmitted to Power Unit and the DSLAM in the Remote Cabinet. The voltage inserted into the telephone line (wireline) at the CPE is shown here as −60 vDC. The voltage supplied by the Power Unit is −48 v and a portion of the required power is received from each of the CPEs served by the DSLAM in the Remote Cabinet. The power unit present in the Remote Cabinet determines the load represented by the DSLAM and draws some power from each CPE according to the number of CPEs able to provide power. The power unit strives to divide the power requirement evenly over each supplying CPE.

Figure 3:
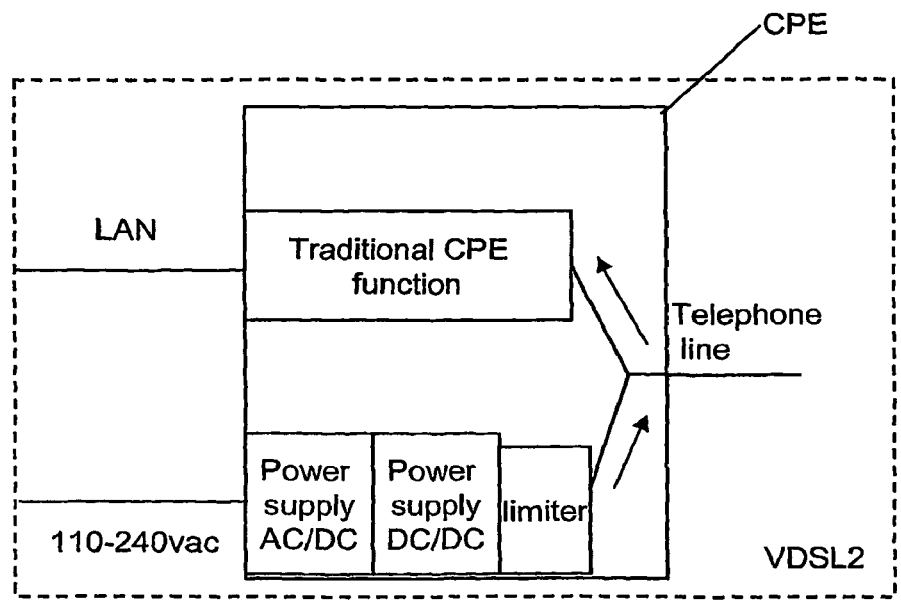
FIG. 3 is a high-level block diagram of the CPE according to an embodiment of the present invention.

FIG. 3 is a high-level block diagram of the CPE according to an embodiment of the present invention. The CPE is a modified traditional CPE wherein a connection is provided that accepts the premises power, e.g., 110 vac to 240 vac in order to supply power to the DSLAM.

The premises power is converted from AC to DC and then supplied to the DC/DC power supply which regulates the voltage. The regulated DC voltage is then inserted into the incoming telephone line, or wireline, for transmission to the power unit in the Remote Cabinet. The power unit will regulate the amount of power drawn from the subscriber's CPE according to the number of connected CPEs.

By introducing power from the home, power can be supplied to telecom equipment in outdoor/remote cabinets with relatively short distances between the subscriber and the cabinet. All of the subscriber CPE's connected to the DSLAM will provide a portion of the required power to the remote cabinet. The CPE at the subscriber premises is already connected to the power mains in the subscriber premises so, providing power, via the telephone line to the outdoor cabinet is relatively simple. The remote cabinet includes a circuit for receiving the power input from each subscriber and then distributing the power, required by the DSLAM load, equally among the subscribers.

A CPE capable of supplying a proper voltage to the DSLAM, e.g., −60 v DC is installed at the subscriber premises. Power inserted on to the existing telephone line does not affect the phone line or a broadband connection. The broadband services provided may include ADSL, VDSL2, Symmetric Digital Subscriber Line (SDSL) and ISDN Digital Subscriber Line (IDSL), and Symmetric High-speed Digital Subscriber Line (SHDSL). To prevent a total loss of power if all CPE's were switched off, the power missing from the CPEs could be supplemented with other power sources like solar, battery and remote power—to secure stand by operation.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

The invention claimed is:

1. A method performed by a remote device connected to a network, the method comprising:
   providing a broadband service to a plurality of customer premises equipment via a plurality of telephone lines,
   drawing electrical power from a power circuit in each of the plurality of customer premises equipment via the plurality of telephone lines, wherein the electrical power is converted from AC power (alternating current) to DC power (direct current),
   regulating an amount of DC power drawn from a single customer premises equipment based on a number of customer premises equipment connected to the remote device and electrical power requirements of the remote device.

2. The method of claim 1, wherein the remote device receives power from other sources.

3. The method of claim 1, wherein the telecom service is one of:
   Asymmetric Digital Subscriber Line (ADSL),
   Symmetric Digital Subscriber Line (SDSL),
   Very High Speed Digital Subscriber Line 2 (VDSL2)
   ISDN Digital Subscriber Line (IDSL), and
   Symmetric High-speed Digital Subscriber Line (SHDSL).

4. The method of claim 1, further comprising drawing an even amount of power from each of the plurality of customer premises equipment.

5. A remote device configured to provide a broadband service to a plurality of customer premises equipment via a plurality of telephone lines, the remote device comprising:
   a providing circuit for providing broadband service to said plurality of customer premises equipment via said plurality of telephone lines; and
   a regulating circuit configured to regulate an amount of DC power (direct current) drawn from a single customer premises equipment based on a number of customer premises equipment connected to the remote device and to draw via respective telephone lines DC power from each customer premises equipment connected the remote device to match electrical power requirements of the remote device.

6. The remote device of claim 5, wherein the remote device receives power from other sources.

7. The remote device of claim 5, wherein the telecom service is one of:
   Asymmetric Digital Subscriber Line (ADSL),
   Symmetric Digital Subscriber Line (SDSL),
   Very High Speed Digital Subscriber Line 2 (VDSL2)
   ISDN Digital Subscriber Line (IDSL), and
   Symmetric High-speed Digital Subscriber Line (SHDSL).

8. The remote device of claim 5, wherein the regulating circuit regulates an even amount of power drawn from each of the plurality of customer premises equipment.

9. A method in a customer premises equipment providing a broadband service, the method comprising:
- receiving a broadband service from a remote device via a telephone line, wherein the customer premises equipment is configured to connect electrical power from a power circuit to the telephone line, wherein the electrical power is converted from AC power (alternating current) to DC power (direct current); and
- providing an amount of the DC power to the remote device via the telephone line, which amount of the DC power drawn from the customer premises equipment is based on a number of customer premises equipment connected to the remote device and electrical power requirements of the remote device.

10. A customer premises equipment for providing a broadband service, the customer premises equipment comprising:
- a receiver configured to receive a broadband service from a remote device via a telephone line;
- a connecting circuit configured to connect electrical power from a power circuit to the telephone line, wherein the electrical power is converted from AC power (alternating current) to DC power (direct current); and to provide an amount of the DC power to the remote device via the telephone line, which amount of the DC power drawn from the customer premises equipment is based on a number of customer premises equipment connected to the remote device and electrical power requirements of the remote device.

* * * * *

UNITED STATES PATENT AND TRADEMARK OFFICE
CERTIFICATE OF CORRECTION

PATENT NO. : 9,866,397 B2
APPLICATION NO. : 15/224589
DATED : January 9, 2018
INVENTOR(S) : Hansen et al.

Page 1 of 1

It is certified that error appears in the above-identified patent and that said Letters Patent is hereby corrected as shown below:

In the Specification

In Column 1, Line 9, delete "2014," and insert -- 2014, now U.S. Pat No. 9,432,081, --, therefor.

In Column 3, Line 56, delete "CPE's" and insert -- CPEs --, therefor.

In Column 4, Line 6, delete "CPE's" and insert -- CPEs --, therefor.

In the Claims

In Column 4, Line 39, in Claim 3, delete "(VDSL2)" and insert -- (VDSL2), --, therefor.

In Column 4, Line 65, in Claim 3, delete "(VDSL2)" and insert -- (VDSL2), --, therefor.

Signed and Sealed this
Eighteenth Day of September, 2018

Andrei Iancu
*Director of the United States Patent and Trademark Office*